(12) United States Patent
Yamashita

(10) Patent No.: US 6,209,516 B1
(45) Date of Patent: Apr. 3, 2001

(54) CONTROL SYSTEM AND CONTROL METHOD FOR DIESEL ENGINE

(75) Inventor: Masayuki Yamashita, Kyogo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/428,232

(22) Filed: Oct. 27, 1999

(30) Foreign Application Priority Data

Oct. 30, 1998 (JP) .................................................. 10-309863

(51) Int. Cl.[7] .......................... F01L 13/00; F02D 15/02; F02D 41/40; F02D 43/00
(52) U.S. Cl. .................. 123/305; 123/78 BA; 123/90.15
(58) Field of Search .......................... 123/78 BA, 78 BF, 123/90.15, 294, 295, 305

(56) References Cited

U.S. PATENT DOCUMENTS

| | | | |
|---|---|---|---|
| 4,883,032 | * 11/1989 | Hunter et al. | 123/276 |
| 5,373,816 | 12/1994 | Asai et al. | 123/65 PE |
| 5,697,332 | 12/1997 | Asai et al. | 123/65 PE |

FOREIGN PATENT DOCUMENTS

| | | | |
|---|---|---|---|
| 771279 | 3/1995 | (JP) . | |
| 9-324631 | * 12/1997 | (JP) . | |

* cited by examiner

*Primary Examiner*—Tony M. Argenbright

(57) ABSTRACT

A control system for a compression ignition type diesel engine includes an operating state detecting unit for detecting the operating state of the diesel engine. A combustion mode selecting unit selects, in correspondence with the output of the operating state detecting unit, a first combustion mode, wherein fuel injection is carried out in the first half of the compression stroke, or a second combustion mode, wherein fuel injection is carried out at around compression top dead center. An effective compression ratio varying unit varies the effective compression ratio of the diesel engine and a control unit controls the effective compression ratio varying unit to lower the effective compression ratio when the first combustion mode is selected by the combustion mode selecting unit compared to when the second combustion mode is selected. When the first combustion mode is selected by the combustion mode selecting unit, by fuel injection being carried out in the first half of the compression stroke and the effective compression ratio being lowered so that compression ignition occurs at around compression top dead center, a uniform highly diffuse premix combustion can be realized. When the second combustion mode is selected by the combustion mode selecting unit, by fuel injection being carried out at compression top dead center and ignition occurring at around compression top dead center substantially simultaneously with fuel injection, without the effective compression ratio being lowered, diffusion combustion is realized.

8 Claims, 4 Drawing Sheets

CONTROL SYSTEM AND CONTROL METHOD FOR DIESEL ENGINE

BACKGROUND OF THE INVENTION

This invention relates to a control system for a diesel engine having a combustion mode for low engine loads whereby fuel injection is carried out in the first half of the compression stroke.

Generally in diesel engines, fuel injection is carried out at around top dead center of the compression stroke and combustion is effected substantially simultaneously with fuel injection. This is known as a diffusion combustion. In practice, the injected fuel front mixes with air and forms a gas mixture, and thus the diffusion combustion and a slight premix combustion both occur. When the proportion of diffusion combustion is large, the emission of uncombusted fuel particles (particulate gas) increases, and when the proportion of premix combustion is large, the emission of $No_x$ gases increases. Consequently, it has been difficult to reduce $No_x$ and particulate gas emissions at the same time.

To reduce $No_x$ and particulate gas emissions simultaneously, various proposals have been made for combustion wherein fuel and air are mixed uniformly inside the cylinder before a compression ignition (uniform highly diffuse premix combustion). In the uniform highly diffuse premix combustion, the fuel injection timing is advanced to around bottom dead center of the compression stroke so that the fuel and air mix uniformly before compression ignition occurs. With the uniform highly diffuse premix combustion, because the fuel and air are mixed uniformly, it is possible to reduce particulate gas emissions, and because there are fewer local hot spots, it is also possible to reduce $No_x$ emissions.

However, because diesel engines use a compression ignition, and the ignition occurs as soon as the pressure inside the cylinder has risen sufficiently after the fuel is injected, with the uniform highly diffuse premix combustion, the ignition timing has not been stable and ignition timing control has been impossible. Consequently, in an engine set to a high compression ratio, there has been a risk of ignition occurring early, before compression top dead center is reached.

And when, in order to stabilize ignition, a low compression ratio is set, thermal efficiency drops and it becomes impossible to develop sufficient power for high speeds and high loads; fuel consumption deteriorates; and there is also a risk of a deterioration in cold-starting performance.

SUMMARY OF THE INVENTION

It is, therefore, an object of the present invention to provide a control system for a diesel engine capable of realizing a uniform highly diffuse premix combustion by making possible a combustion mode wherein fuel injection is carried out in the first half of the compression stroke.

To achieve this and other objects, in a first provision of the invention, a control system for a compression ignition type diesel engine comprises operating state detecting means for detecting the operating state of the diesel engine; combustion mode selecting means for selecting, in correspondence with the output of the operating state detecting means, a first combustion mode, wherein fuel injection is carried out in the first half of the compression stroke, or a second combustion mode, wherein fuel injection is carried out at around compression top dead center; effective compression ratio varying means for varying the effective compression ratio of the diesel engine; and control means for controlling the effective compression ratio varying means to lower the effective compression ratio when the first combustion mode is selected by the combustion mode selecting means compared to when the second combustion mode is selected.

By this means, when the first combustion mode is selected by the combustion mode selecting means, by fuel injection being carried out in the first half of the compression stroke and the effective compression ratio being lowered so that compression ignition occurs at around compression top dead center, uniform highly diffuse premix combustion can be realized.

When the second combustion mode is selected by the combustion mode selecting means, by fuel injection being carried out at around compression top dead center and ignition occurring at around compression top dead center substantially simultaneously with fuel injection, diffusion combustion can be realized without the effective compression ratio being lowered.

Thus, even in a diesel engine having a high compression ratio, a combustion mode, wherein fuel injection is carried out in the first half of the compression stroke, can be provided and a uniform highly diffuse premix combustion with stable ignition timing can be realized. As a result, exhaust gas quality improvement and noise reduction can be realized without loss of starting performance or power output capacity.

BRIEF DESCRIPTION OF THE DRAWINGS

The present invention will become more fully understood from the detailed description given hereinbelow and the accompanying drawings which are given by way of illustration only, and thus are lot limitative of the present invention, and wherein.

DETAILED DESCRIPTION OF THE PREFERRED EMBODIMENTS

The control system for a diesel engine, according to this embodiment, has a first combustion mode for carrying out fuel injection in a first half of the compression stroke (at around compression bottom dead center) in a low-load operating region (low-speed, medium/low-load operating region). The system also has a second combustion mode for carrying out fuel injection at around compression top dead center in a high-load operating region.

In case of the first combustion mode in the low-speed, medium/low-load operating region, the fuel injection timing is advanced to around compression bottom dead center, thereby uniformly mixing fuel and air in a cylinder before compression ignition, and simultaneously, the valve closing timing of an intake valve is delayed by a variable valve timing mechanism (VVT) as effective compression ratio varying means to lower the effective compression ratio, whereby ignition is effected in a mixed air state around compression top dead center (uniform highly diffuse premix combustion).

In case of the second combustion mode in the high-load operating region, the fuel injection is carried out around compression top dead center, and, without delaying the valve closing timing of an intake valve by the variable valve timing mechanism (VVT) as effective compression ratio varying means, ignition is effected around compression top dead center substantially simultaneously with the fuel injection in a state that the effective compression ratio is not lowered (diffusion combustion).

Figure 1:
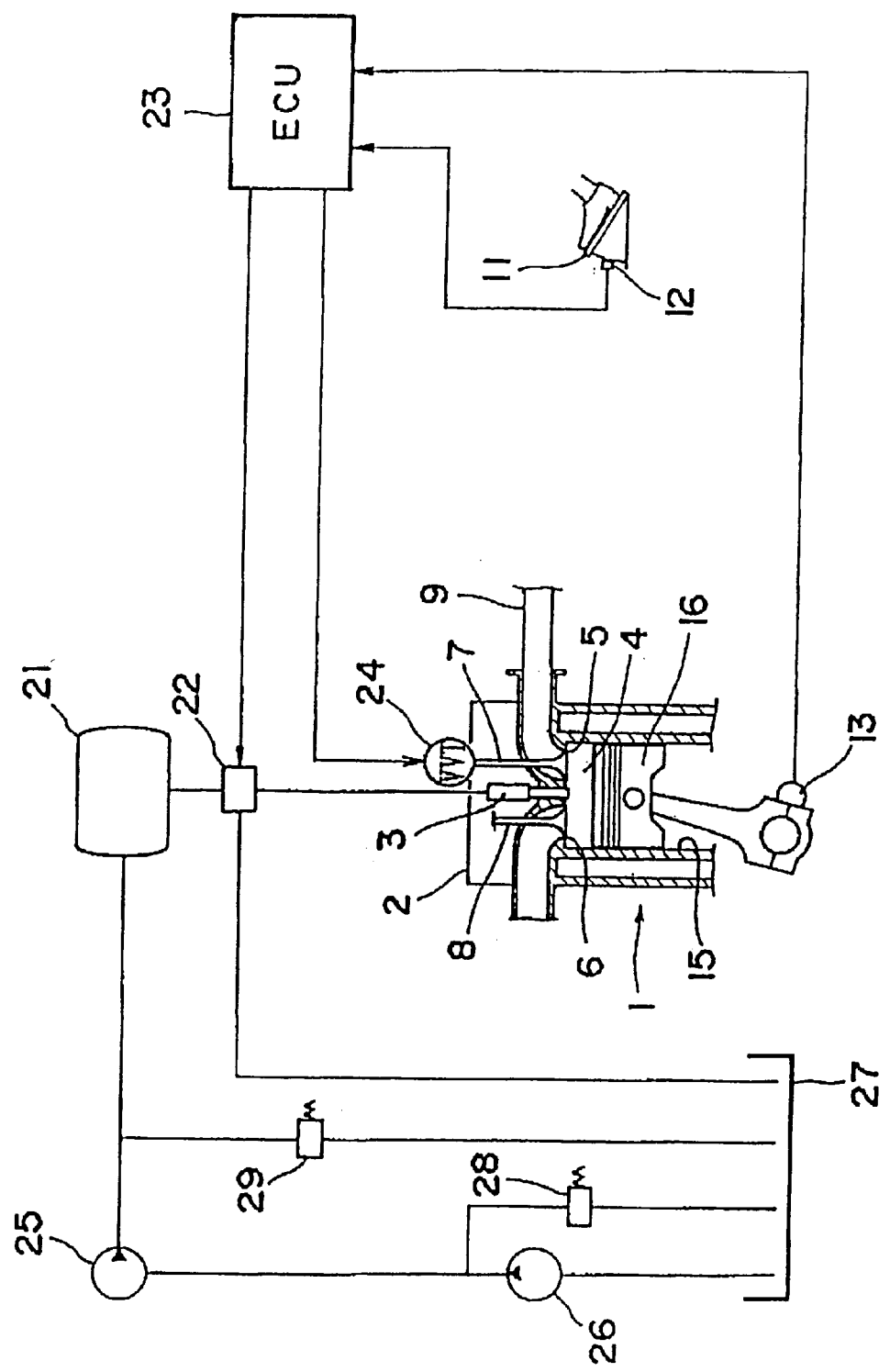
FIG. 1 is a schematic view of a diesel engine control system constituting a preferred embodiment of the invention.
Figure 2:
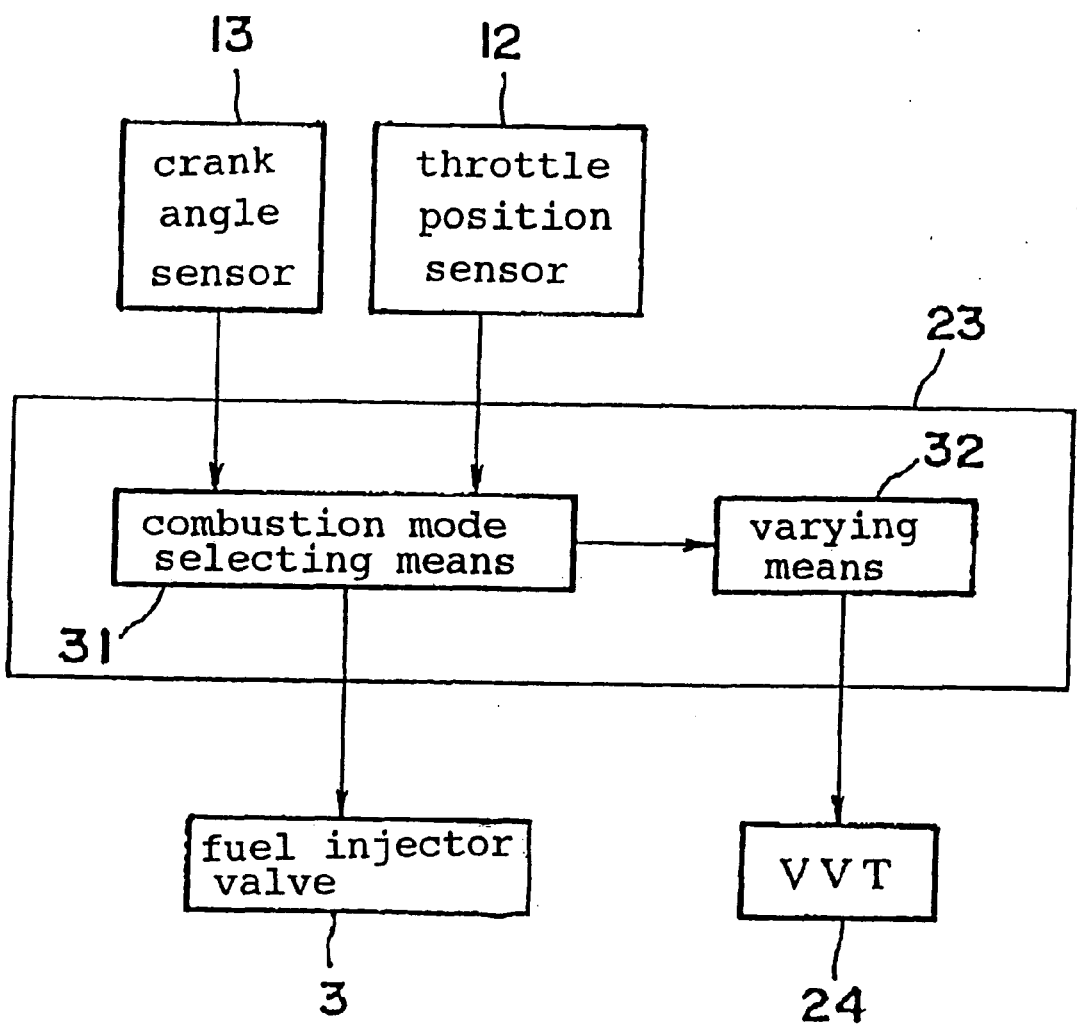
FIG. 2 is a block diagram of the control system.
Figure 3:
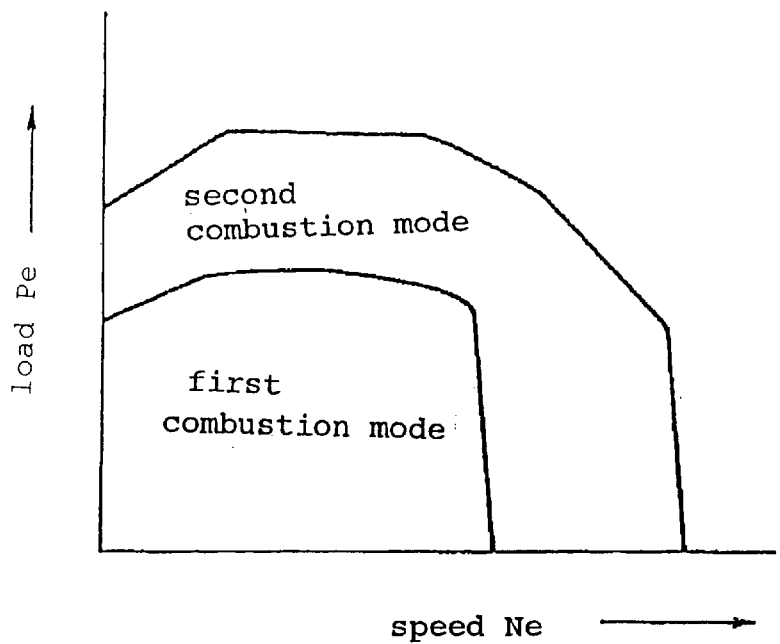
FIG. 3 is a map for selecting a combustion mode.
Figure 4A:
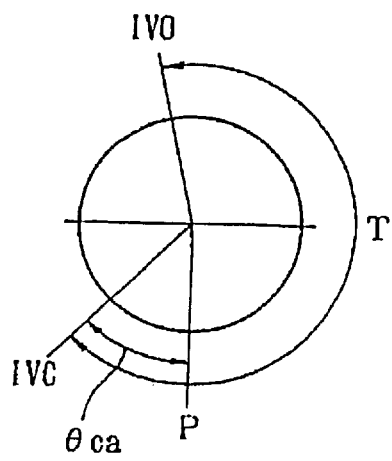
FIGS. 4A and 4B are views illustrating a timing of opening and closing of an intake valve for varying effective compression ratio.
Figure 4B:
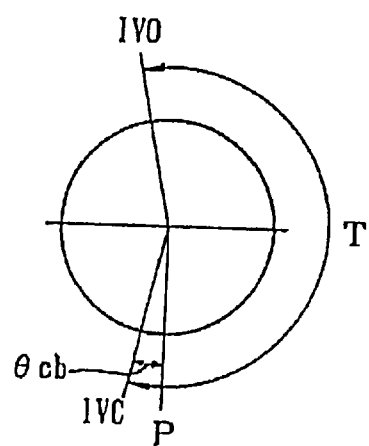
Figure 5:
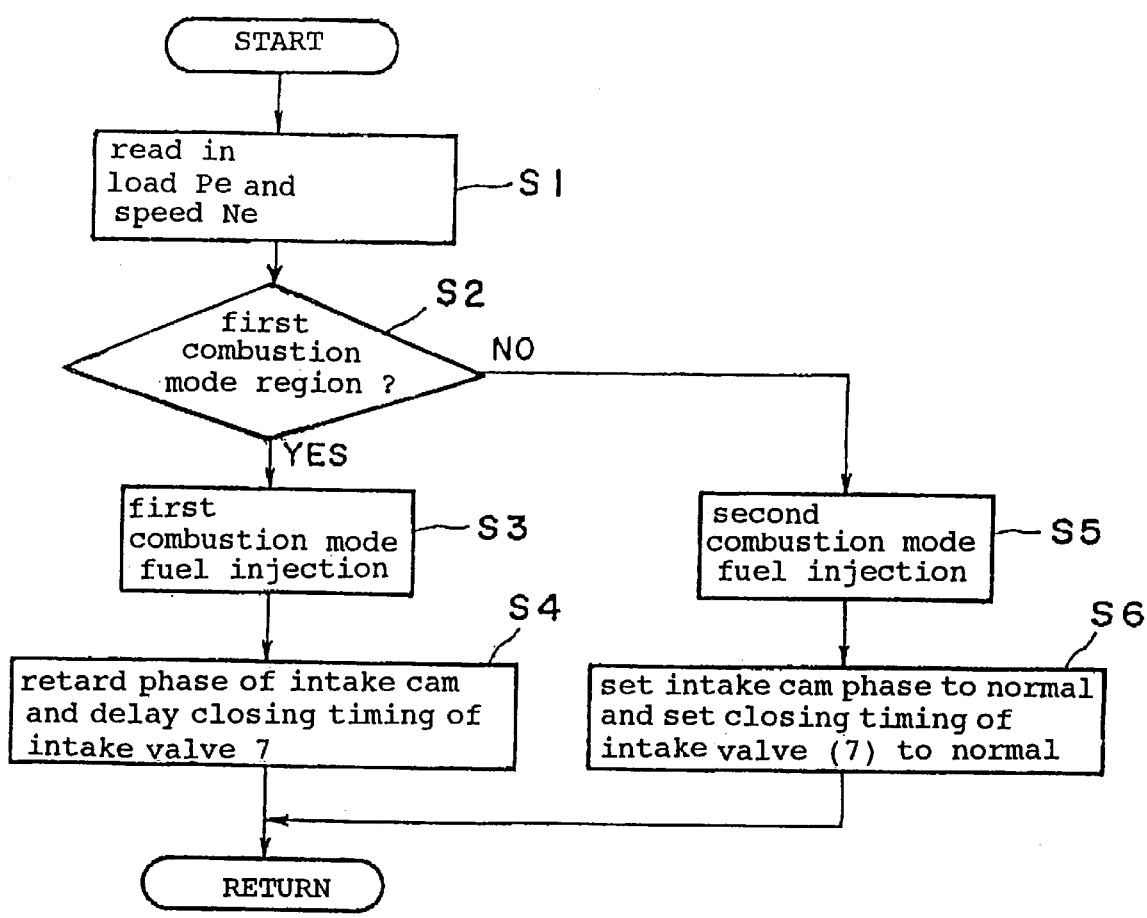
FIG. 5 is a flow chart of combustion mode control in the preferred embodiment.

The control system for a diesel engine, according to this embodiment, is specifically described with reference to the drawings. FIG. 1 is a schematic view of a diesel engine control system constituting a preferred embodiment of the invention; FIG. 2 is a block diagram of the control system; FIG. 3 is a map for selecting a combustion mode; FIGS. 4A and 4B are views illustrating a timing of opening and closing of an intake valve for varying effective compression ratio; and FIG. 5 is a flow chart of combustion mode control in the preferred embodiment.

As shown in FIG. 1, each cylinder in a cylinder head 2 of a diesel engine 1 is provided with a fuel injector valve 3, and the nozzle port of the fuel injector valve 3 opens to a combustion chamber 4. An intake port 5 and an exhaust port 6, opening to the combustion chamber 4, are formed in the cylinder head 2; the intake port 5 is opened and closed by an intake valve 7, and the exhaust port 6 is opened and closed by an exhaust valve 8. A piston 16 is fitted slideably in the vertical direction in each of the cylinders 15 of the diesel engine 1.

An accelerator angle sensor 12 detects a depression angle of an accelerator pedal 11. A crank angle sensor 13 outputs a crank angle signal for each of the cylinders at a predetermined crank position and also makes it possible to detect the speed of the diesel engine 1.

The fuel injector valves 3 provided for each cylinder are connected by electromagnetic valves 22 to a common rail 21. By the operation of the electromagnetic valves 22, fuel accumulated under pressure in the common rail 21 is injected through the fuel injector valves 3 with a desired timing. The electromagnetic valves 22 are operated by commands from a control unit (ECU) 23. High-pressure fuel is supplied to the common rail 21 from a high-pressure pump 25 and accumulated in the common rail 21 under a high pressure. A low-pressure pump 26 is connected to the upstream side of the high-pressure pump 25 and supplies fuel from inside a fuel tank 27 to the high-pressure pump 25. The reference numeral 28 in the figure denotes a low-pressure regulator valve and the reference numeral 29 a high-pressure regulator valve. Although the electromagnetic valves 22 and the fuel injector valves 3 are shown apart from one another in the figure, in practice they are constructed as integrated units.

The intake valve 7 has its closure timing adjusted by a variable valve timing mechanism (VVT) 24, serving as effective compression ratio varying means, and the intake port 5 is thereby opened and closed with a desired timing. For example, with respect to the intake port 5 being closed at around bottom dead center of the compression stroke and compression thus being started after around bottom dead center of the compression stroke, by the closure timing of the intake port 5 being delayed and the timing at which compression is started thereby being delayed, the effective compression ratio of the diesel engine 1 can be lowered. The VVT 24 is controlled by commands from the ECU 23 to produce an effective compression ratio corresponding to a combustion mode set in accordance with the operating state of the engine.

As the VVT 24, a known mechanism for varying the timing at which the intake valve 7 is driven, such as a mechanism having on a camshaft, a plurality of cams for driving a single intake valve 7 and switches among the cams, or a mechanism which varies the angular phase of the camshaft itself, is used.

Also, as the effective compression ratio varying means, it is possible to use a mechanism other than the VVT 24, such as a mechanism which mechanically varies the volume of the cylinder 15 by varying the stroke of the piston attached to a crankshaft by a connecting rod. The mechanical varying of the piston stroke can be achieved by fitting an eccentric bearing to either the crank pin of the crank shaft or to the piston pin of the piston, and this eccentric bearing is adjusted by using a hydraulic mechanism or the like.

Detection information from the accelerator angle sensor 12 and the crank angle sensor 13 is inputted to the ECU 23 and an engine load Pe, corresponding to the acceleration angle detected by the accelerator angle sensor 12, is recognized and a speed Ne of the diesel engine 1, detected by the crank angle sensor 13, is recognized. In the ECU 23, a combustion mode is selected on the basis of the load Pe and the speed Ne. The electromagnetic valves 22, provided upstream of the fuel injector valves 3, are controlled to produce a fuel injection timing corresponding to the selected combustion mode, and the VVT 24 is controlled to produce an effective compression ratio corresponding to the selected combustion mode.

In the ECU 23, as shown in FIG. 2, the detection information from the accelerator angle sensor 12 and the crank angle sensor 13 is inputted to combustion mode selecting means 31. In the combustion mode selecting means 31, a present combustion mode is searched from a map, as shown in FIG. 3, on the basis of the load Pe and the speed Ne, and selects a combustion mode. A fuel injection timing is issued to the electromagnetic valves 22 from the combustion mode selecting means 31 on the basis of the selected combustion mode.

That is, when a first combustion mode, for a low-speed, medium/low-load operating region shown in FIG. 3, is selected, the timing of fuel injection is controlled so that fuel and air are mixed uniformly in the cylinder 15 before compression ignition (uniform highly diffuse premix combustion) by fuel injection timing being advanced to the first half of the compression stroke (around bottom dead center of the compression stroke). When a second combustion mode, for a high load operating region shown in FIG. 3, is selected, the timing of fuel injection is controlled so that fuel injection is carried out at around top dead center of the compression stroke and ignition occurs at around top dead center of the compression stroke, substantially simultaneously with fuel injection (diffusion combustion).

At the same time, when the first combustion mode is selected, selection information is fed from the combustion mode selecting means 31 to varying means 32 (control means), and the varying means 32 operates the VVT 24 such that the closure timing of the intake port 5 is delayed (see FIG. 4A) as compared to when the second combustion mode is selected the effective compression ratio is lowered. When no command operating the VVT 24 is sent from the varying means 32, the VVT 24 is so controlled that the closure timing of the intake port 5 is around bottom dead center of the compression stroke (see FIG. 4B).

In other words, as shown in FIGS. 4A and 4B, the angle $\theta_{ca}$ from compression bottom dead center P to the valve closing time IVC, at which the intake valve 7 closes when the first combustion mode has been selected, is set larger than the angle $\theta_{cb}$ from compression bottom dead center P to the valve closing time IVC, at which the intake valve 7 closes when the second combustion mode has been selected, so that the effective compression ratio decreases. The reference symbol IVO in FIGS. 4A and 4B is the valve opening time, at which the intake valve 7 opens, and the interval between the valve opening time IVO and the valve closing time IVC, shown by the arrow T, is the opening drive timing of the intake valve 7.

As the mechanism for varying the fuel injection timing, besides using a common rail system as in the preferred embodiment described above, it is possible, for example, to use a mechanism which varies the injection timing with an electromagnetic spill valve of a time-controlled distributor pump, or a mechanism using an electronically controlled injection pump with a wide advance angle range.

The operation of the diesel engine control system will now be described on the basis of FIG. 5. In step S1, a load Pe, based on the detection information of the accelerator angle sensor 12, and a speed Ne, based on the detection information of the crank angle sensor 13, are read in, and in step S2 it is determined whether or not the present load Pe and speed Ne are in the first combustion mode region.

When, in step S2, it is determined that the load Pe and the speed Ne are in the first combustion mode region, because this is the low-speed, medium/low-load operating region, in step S3, first combustion mode fuel injection is carried out. That is, the timing of fuel injection from the fuel injector valves 3 is controlled by controlling the operation of the electromagnetic valves 22, and the fuel injection timing is thereby advanced so that fuel injection is executed at around compression bottom dead center and fuel and air mix uniformly in the cylinder 15 before compression ignition. Also, in step S4, the VVT 24 is operated to drive the intake valve 7 with the phase of the intake cam retarded and the closure timing of the intake port 5 delayed, whereby the effective compression ratio is lowered (uniform highly diffuse premix combustion).

Thus in the low-speed, medium/low-load operating region, a low compression ratio is set and the fuel injection timing is advanced; the compression cylinder pressure and temperature decrease; ignition is delayed and the ignition timing consequently stabilizes; and premix compression ignition is realized. As a result, fuel and air are mixed uniformly so that there is a reduction in particulate gas emission, and the combustion temperature falls so that there is a reduction in $No_x$ emission.

On the other hand, when, in step S2, the present load Pe and speed Ne are not in the first combustion mode region, that is, when they are determined to be in the second combustion mode region, because this is the high-load operating region, in step S5, second combustion mode fuel injection is carried out. That is, the timing of fuel injection from the fuel injector valves 3 is controlled by controlling the operation of the electromagnetic valves 22, and the fuel injection timing is thereby controlled so that fuel injection is executed at around compression top dead center. Also, in step S6, the VVT 24 is operated to drive the intake valve 7 with the phase of the intake cam normal (not lagging) and the closure timing of the intake port 5 substantially at around compression bottom dead center, whereby the effective compression ratio is not lowered and ignition occurs at around compression top dead center substantially simultaneously with fuel injection (diffusion combustion).

Thus in the high-load operating region, a high compression ratio is set and the fuel injection timing is brought to around compression top dead center, and diffusion combustion is realized. As a result, a necessary output capacity can be amply obtained and there is no deterioration in cold starting performance.

In the preferred embodiment as described above, in a first combustion mode for a low-speed, medium/low-load operating region, compared to a second combustion mode for a high-load operating region, the closure timing of the intake port 5 is delayed to lower the effective compression ratio. When the effective compression ratio is lowered, the fuel injection quantity or the engine speed at the time may be lowered continuously in correspondence with the fuel injection timing. However, the point that the effective compression ratio is lower in the first combustion mode than in the second combustion mode is unchanged.

In the diesel engine control system as described above, the combustion mode selecting means 31 selects a first combustion mode, wherein fuel injection is carried out in the first half of the compression stroke, in a low-speed, medium/low-load operating region, and selects a second combustion mode, wherein fuel injection is carried out at around compression top dead center, in a high-load operating region, and when the first combustion mode is selected by the combustion mode selecting means 31 the VVT 24 is operated to delay the closing timing of the intake port 5 so that the effective compression ratio is lowered as compared to when the second combustion mode is selected, whereby it is possible to realize a uniform highly diffuse premix combustion in the low-speed, medium/low-load operating region. And when the combustion mode selecting means 31 selects the second combustion mode, fuel injection is carried out at around compression top dead center and the effective compression ratio is not lowered and ignition occurs at around compression top dead center substantially simultaneously with fuel injection, whereby diffusion combustion is realized.

Thus even in a diesel engine having a high compression ratio, a combustion mode, wherein fuel injection is carried out in the first half of the compression stroke, can be provided and a uniform highly diffuse premix combustion can be realized, and exhaust gas quality improvement and noise reduction can be realized without loss of starting performance or power output capacity.

Although in the preferred embodiment described above the engine load was detected in correspondence with the accelerator angle, the engine load may alternatively be detected from the accelerator angle and the engine speed on the basis of a map or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for a compression ignition type diesel engine, comprising:

operating state detecting means for detecting an operating state of the diesel engine;

combustion mode selecting means for selecting, in correspondence with the output of the operating state detecting means, a first combustion mode, wherein fuel injection is carried out in the first half of the compression stroke, or a second combustion mode, wherein fuel injection is carried out at around compression top dead center;

effective compression ratio varying means for varying the effective compression ratio of the diesel engine; and control means for controlling the effective compression ratio varying means to lower the effective compression ratio when the first combustion mode is selected by the combustion mode selecting means compared to when the second combustion mode is selected.

2. A control system for a diesel engine, according to claim 1, wherein the combustion mode selecting means selects the first combustion mode when the operating state of the diesel engine detected by the operating state detecting means is in a low-load operating region and selects the second combustion mode on cold-starting of the engine and when the operating state is in a high-load operating region.

3. A control system for a diesel engine, according to claim 1, wherein the effective compression ratio varying means implements at least a high compression ratio mode, in which the effective compression ratio varying means controls the effective compression ratio of the diesel engine to a high compression ratio, and a low compression ratio mode, in which the effective compression ratio varying means controls the effective compression ratio of the diesel engine to a lower compression ratio than in the high compression ratio mode, and the control means controls the effective compression ratio varying means to implement the low compression ratio mode when the first combustion mode is selected by the combustion mode selecting means and controls the effective compression ratio varying means to implement the high compression ratio mode when the second combustion mode is selected.

4. A control system for a diesel engine, according to claim 1, wherein the effective compression ratio varying means includes a variable valve timing mechanism for controlling the timing of opening and closing of an intake valve for opening and closing an intake port opening to a combustion chamber of the diesel engine.

5. A control system for a diesel engine, according to claim 4, wherein the control means controls the variable valve timing mechanism to delay the closing timing of the intake valve when the first combustion mode is selected by the combustion mode selecting means compared to when the second combustion mode is selected.

6. A control system for a diesel engine, according to claim 1, wherein the effective compression ratio varying means includes a variable piston stroke mechanism for mechanically varying a piston stroke of a piston fitted in a cylinder of the diesel engine.

7. A control system for a diesel engine, according to claim 6, wherein the control means controls the piston stroke varying mechanism so that the effective compression ratio is lower when the first combustion mode is selected by the combustion mode selecting means compared to when the second combustion mode is selected.

8. A control method for a compression ignition type diesel engine, comprising:

detecting an operating state of the diesel engine;

selecting, on the basis of the detected operating state of the diesel engine, one of a first combustion mode, wherein fuel injection is carried out in the first half of the compression stroke, and a second combustion mode, wherein fuel injection is carried out at around compression top dead center; and when the first combustion mode is selected, controlling the timing of fuel injection so that fuel injection is carried out in the first half of the compression stroke and controlling the effective compression ratio of the diesel engine so that the effective compression ratio is lowered compared to when the second combustion mode is selected.

* * * * *